Sept. 12, 1967 N. SZEREMY 3,341,656
DYNAMICALLY REGULATED CLIPPER SYSTEM FOR A TELEVISION RECEIVER WHICH IS OPERATIVE OVER A WIDE RANGE OF VIDEO SIGNAL AMPLITUDE
Filed Jan. 21, 1964
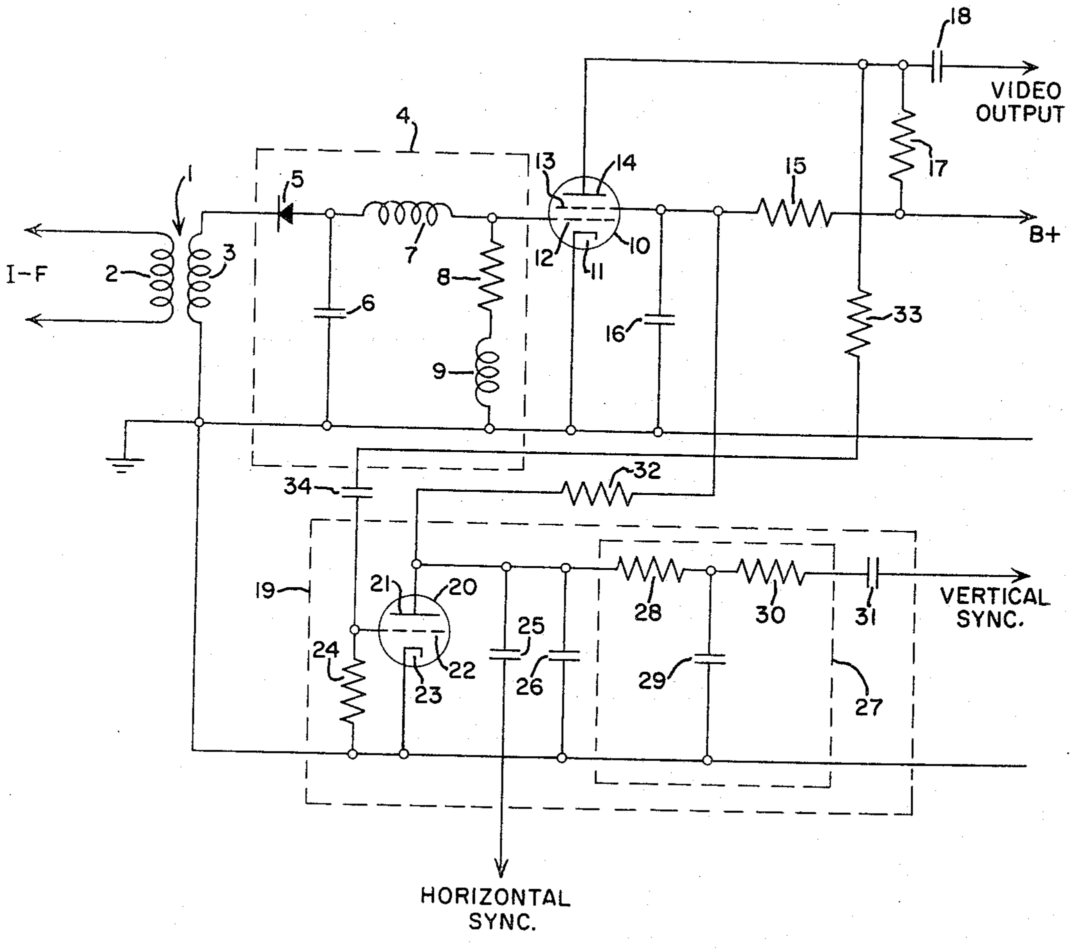
INVENTOR:
NORMAN SZEREMY.
BY Donald N. Timbie
HIS ATTORNEY.

United States Patent Office 3,341,656

Patented Sept. 12, 1967

3,341,656

DYNAMICALLY REGULATED CLIPPER SYSTEM FOR A TELEVISION RECEIVER WHICH IS OPERATIVE OVER A WIDE RANGE OF VIDEO SIGNAL AMPLITUDE

Norman Szeremy, Syracuse, N.Y., assignor to General Electric Company, a corporation of New York Filed Jan. 21, 1964, Ser. No. 339,190
5 Claims. (Cl. 178—7.3)

ABSTRACT OF THE DISCLOSURE

A clipper system for a television receiver comprising a first electron tube in combination with a second electron tube of a video amplifier. The second electron tube which provides an amplifier for demodulated composite video signals for the television receiver at the plate electrode thereof additionally provides a clipper control voltage at the screen electrode thereof which is coupled to the plate electrode of the first electron tube. The amplified demodulated composite video output is then coupled to the grid electrode of the first electron tube to achieve a clipped output at any signal level.

My invention relates to an improved clipper system and, more particularly, to an improved clipper system for utilization in a television receiver.

In a conventional television receiver the clipper circuit is utilized to provide the signals which are integrated and differentiated to provide vertical and horizontal synchronizing (sync) signals. These clipper circuits have to satisfy the following general requirements:

(1) The clipper tube cut-off has to be low enough to provide clipping action at any input signal.

(2) the output signal of the clipper circuit has to have as large an amplitude as possible for both the horizontal and vertical sync signals.

(3) The amplitude of the vertical sweep pulse that is fed back through the integrator from the vertical sweep generator and appears at the clipper output should be as small as possible in relation to the amplitude of the horizontal sync signal output of the clipper, to minimize horizontal "top curl," or image bending, in the picture.

(4) The hum voltage contribution of the power supply should be very small in comparison to the amplitude of the clipper tube output.

For requirement (1) it is necessary to have a relatively low, stiff and well-filtered supply voltage. However, in most television sets such a low supply voltage is not readily available without introducing a large additional cost. To overcome this problem the standard procedure is to place a resistance in series with the plate of the clipper tube and a bleeder resistance from the plate to the cathode of the clipper tube.

This arrangement permits the realization of a relatively low supply voltage at the plate of the tube. However, there are still difficulties even with this clipper circuit. In order to have a low clipper tube cut-off and to keep the magnitude of that portion of the vertical sweep signal which is fed back small in comparison to the clipper output, it is necessary that the series resistance and the bleeder resistance be relatively small. This necessitates the use of resistors with a relatively high power dissipation capability and also reduces the clipper output level, because of a reduction of the effective plate load impedance. This in turn affects the requirement of having a low magnitude for that portion of the vertical sweep signal that is fed back to the clipper output, because the small clipper output amplitude necessitates the use of a small integrator resistor in order to provide a sufficient vertical sync signal at the integrator output. In addition, this circuit arrangement does not provide any means for reducing the hum voltage contribution from the power supply.

These disadvantages are overcome in my invention by utilizing a component, which is already present and performing another function in the television circuit, to control the plate voltage of the clipper tube.

It is an object of my invention to provide a clipper system which will produce clipping of an input signal at any signal level.

Another object of my invention is to provide a clipper circuit to produce clipping of the video signal in a television system, the clipper circuit having a large signal amplitude for both the horizontal and vertical sync signals and having the portion of the vertical sweep signal that is fed back through the integrator circuit very small in comparison to the horizontal sync signal.

Other objects and advantages of my invention will become apparent as the following description proceeds and the features of novelty which characterize my invention will be pointed out with particularity in the claims annexed to and forming part of this specification.

For a better understanding of my invention, reference may be made to the accompanying drawing, the single figure of which is a circuit diagram of my invention.

In carrying out the objects of my invention a component which is already present and performing a separate function in the television receiver circuit is utilized to control the cut-off voltage of the clipper tube. In one form of the invention the sliding screen grid voltage of a video amplifier tube in the video portion of the television circuit provides a variable plate voltage for the clipper tube and, thus, controls the clipping or cut-off level. By placing a dropping resistor between the power supply and the screen grid of the amplifier tube, the screen grid voltage will vary in a manner dependent upon the average strength of the composite video signal, which includes the video, sound carrier and synchronizing signals, applied to the control grid of the amplifier tube. This varying screen grid voltage is then coupled to the plate of the clipper tube. The amplified composite video signal is applied to the clipper tube as an input signal and this signal is clipped at the proper level, dependent upon the average strength of the composite video signal.

Referring to the drawing it may be seen that an IF signal is applied to the primary winding 2 of transformer 1. Transformed action produces an IF signal across the secondary 3 of transformer 1 and this signal is applied to the detector and filter circuit 4. Detector and filter circuit 4 consists of a detector diode 5, and a capacitor 6 and a coil 7 to filter out the IF signal, leaving the desired video envelope. Also included in the detector and fier tube 10. Video amplifier tube 10 consists of a cath- 9 which serves as a load impedance for the detector and provides a DC bias for the control grid of the video amplifier tube 10. Video amplifier tube 10 consists of a cathode 11, a control grid 12, a screen grid 13, and a plate 14.

Cathode 11 of the video amplifier tube may be connected to ground directly, or through an additional biasing resistor, not shown in the drawing. The composite video signal from the detector and filter circuit 4 is applied to control grid 12. Control grid 12 is also supplied with a DC bias obtained frm the series combination of resistor 8 and coil 9. A supply voltage for screen grid 13 of the video amplifier tube 10 is obtained through dropping resistor 15, which is connected to a B+ power supply. A bypass capacitor 16 is connected from screen grid 13 to ground in order to avoid negative feedback on lower modulation frequencies. Capacitor 16 additionally provides a shunting action for the hum signal from the power supply, thereby reducing the power supply hum introduced into the clipper circuit. A plate voltage for video amplifier 10 is obtained from the B+ power supply through resistor 17. The output of the video amplifier is taken from plate 14 and coupled to the succeeding video circuits through capacitor 18.

Clipper circuit 19 includes a clipper tube 20 having a plate 21, a grid 22, and a cathode 23. Cathode 23 is connected directly to ground and grid 22 is connected to ground through resistor 24. Both the vertical and horizontal synchronizing (sync) signals are obtained from the clipper output at plate 21. The horizontal sync signals are shown as being taken off plate 21 through capacitor 25. The horizontal sync signals are achieved by differentiating the clipper output signal by a standard differentiating circuit.

A bypass capacitor 26 is connected from plate 21 to ground just preceding an integrator circuit 27. Integrator circuit 27 is the source of the vertical sync signals and is composed of resistors 28 and 30, and capacitor 29. Due to the increased strength of the clipper output signal as a result of my invention, resistors 28 and 30 may be relatively large and still provide the desired amplitude vertical sync signal. The use of a relatively large resistance for resistors 28 and 30 has the advantage that the portion of the vertical sweep signal that is fed back through the integrator is thereby greatly diminished in amplitude. From the integrator circuit 27 the vertical sync signal is applied to the vertical sweep generator of the cathode ray tube through the coupling capacitor 31.

The improved characteristics of my clipper system are achieved as a result of the coupling between the video amplifier tube 10 and the clipper tube 20. Plate 21 of the clipper tube 20 is provided with a voltage from the screen grid 13 of video amplifier tube 10 through resistor 32. Since, as previously described, the screen grid voltage of the video amplifier tube 10 is proportional to the average strength of the input composite video signal, the plate voltage of clipper tube 20 will also be proportional to the average strength of that signal. The output of video amplifier tube 10, which is an amplified and inverted form of the input composite video signal, is applied to control grid 22 of clipper tube 20 through resistor 33 and capacitor 34.

The operation of my clipper system will now be described. A modulated IF signal appearing on the secondary of the transformer 1 is detected and the IF carrier is filtered out by the detector and filter circuit 4. The resultant composite video signal is applied to the control grid 12 of video amplifier tube 10. Resistor 8 and coil 9 of the detector and filter circuit 4 cause a negative bias signal, proportional to the average strength of the composite video signal, to be applied to control grid 12. If the average strength of the composite video signal decreases, the negative bias on grid 12 will be decreased. Therefore, there will be increased conduction through the video amplifier tube 10 and, consequently, through the screen grid supply lead. Increased conduction through the screen grid supply lead and resistor 15 causes a greater voltage drop across that resistor and, thus, a decrease in the screen grid voltage. The decreased screen grid voltage causes a decrease in the plate voltage of the clipper tube 18 and, therefore, permits proper clipping of the amplified composite video signal, even though the peak value of the signal might not reach the original, higher signal strength cut-off voltage. A similar analysis for an increase in the average strength of the composite video signal will illustrate that the plate voltage of the clipper tube will increase when the average strength of the composite video signal increases. Therefore, maximum clipper tube output, without the loss of clipping action at any composite video signal level, is achieved without the addition of any circuit elements.

The advantages of my circuit are now apparent. Since the control of the clipper tube is achieved from the video amplifier which is already in the television receiver circuit, there are no additional components necessary to produce the desired result. By having the plate voltage of the clipper tube vary in proportion to the average strength of the composite video signal, the clipper tube will properly clip the amplified composite video signal at all signal levels. Also, since the plate voltage is not fixed at a low value, a larger clipper output will be provided when larger composite video signals are applied to the television receiver and an output at least as large as that provided by the conventional circuit will be achieved when small average strength signals are applied. Due to this increased clipper output signal, larger integrator resistors may be used and this results in a reduction of the amplitude of that portion of the vertical sweep signal which is fed back through the integrator circuit, thereby reducing horizontal "top curl" in the picture. Another benefit from the utilization of this circuit occurs in the reduction of the hum voltage contribution by the power supply, due to the by-pass capacitor connected from the screen grid of the video amplifier tube to ground. Yet another benefit is realized by the elimination of one resistor in the plate supply circuit of the clipper tube and the fact that the remaining resistor does not need as high a power dissipation capability as in the conventional circuit.

What I claim as new and desire to be secured by Letters Patent of the United States is:

1. A clipper system for a television receiver comprising: a clipper circuit including an electron tube having a plate and at least two other electrodes including a grid, said electron tube being the active clipper element of said clipper circuit; a video amplifier for amplifying the demodulated composite video signal of a television receiver, said video amplifier providing an input signal to said grid, said video amplifier additionally providing control means for the plate voltage of said electron tube, said control means causing the plate voltage of said electron tube to vary in proportion to the average strength of said composite video signal, whereby proper clipping of said input signal at all signal levels is achieved.

2. A clipper system for a television receiver comprising: a clipper circuit including a first electron tube having a plate and at least two other electrodes, said first electron tube being the active element of said clipper circuit; a video amplifier for amplifying the demodulated composite video signal of the television receiver and for controlling the plate voltage of said first electron tube, said video amplifier comprising a second electron tube having a screen grid and at least three other electrodes; means for supplying an input signal to said first electron tube; means for causing the screen grid voltage of said second electron tube to vary in proportion to the average strength of said composite video signal; means for connecting the plate of said first electron tube to the screen grid of said second electron tube to cause the plate voltage of said first electron tube to vary in proportion to the average strength of said composite video signal, whereby proper clipping of said input signal at all signal levels is achieved.

3. A clipper system for a television receiver comprising: a clipper circuit including a first electron tube having a plate and at least two other electrodes, said first electron tube being the active clipper element of said clipper circuit; a video amplifier for amplifying the demodulated composite video signal of the television receiver and for controlling the plate voltage of said first electron tube, said video amplifier comprising a second electron tube having a screen grid and at least three other electrodes; means for supplying said composite video signal to the input of said second electron tube, said second electron tube producing an amplified form of said composite video signal at its output; means for coupling said amplified signal to the input of said first electron tube; means for causing the screen grid voltage of said second electron tube to vary in proportion to the average strength of said composite video signal, means for connecting the plate of said first electron tube to the screen grid of said second electron tube to cause the plate voltage of said first electron tube to vary in proportion to the average strength of said composite video signal, whereby proper clipping of said amplified signal at all signal levels is achieved.

4. A clipper system for television receivers comprising: a clipper circuit including a first electron tube having a plate, a cathode, and a grid, said first electron tube being the active clipper element of said clipper circuit; a video amplifier for amplifying the demodulated composite video signal of a television receiver and for controlling the plate voltage of said first electron tube, said video amplifier comprising a second electron tube having at least a cathode, a control grid, a screen grid and a plate; means for supplying said composite video signal to the control grid of said second electron tube, said second electron tube producing an amplified form of said composite video signal at its plate; means for coupling said amplified signal to the grid of said first electron tube; means for causing the screen grid voltage of said second electron tube to vary in proportion to the average strength of said composite video signal; means for connecting the plate of said first electron tube to the screen grid of said second electron tube to cause the plate voltage of said first electron tube to vary in proportion to the average strength of said composite video signal, whereby proper and optimized clipping of said amplified signal at all signal levels is achieved.

5. A clipper system for a television receiver as recited in claim 4 wherein a clipper output signal is produced at the plate of said first electron tube; an integrating circuit coupled to the plate of said first electron tube with the clipper output signal from said first electron tube being applied to said integrating circuit to produce a vertical synchronizing signal; said integrating circuit comprising relatively large resistances, whereby the portion of said vertical sweep signal that is fed back to the plate of said first electron tube from the vertical sweep generator is relatively small.

References Cited

UNITED STATES PATENTS

| | | | |
|---|---|---|---|
| 2,293,528 | 8/1942 | Barco et al. | 178—7.3 |
| 2,913,523 | 11/1959 | Freedman | 178—7.3 |
| 2,950,342 | 8/1960 | Revercomb | 178—7.3 |

JOHN W. CALDWELL, *Acting Primary Examiner.*

DAVID G. REDINBAUGH, *Examiner.*

R. L. RICHARDSON, *Assistant Examiner.*